(12) United States Patent
Anand

(10) Patent No.: US 12,508,937 B2
(45) Date of Patent: Dec. 30, 2025

(54) PRIVATE CHARGING STATION AVAILABILITY SYSTEM AND METHOD THEREOF

(71) Applicant: Honda Motor Co., Ltd., Tokyo (JP)

(72) Inventor: Geethanjali Anand, Chicago, IL (US)

(73) Assignee: Honda Motor Co., Ltd., Tokyo (JP)

( * ) Notice: Subject to any disclaimer, the term of this patent is extended or adjusted under 35 U.S.C. 154(b) by 687 days.

(21) Appl. No.: 17/945,828

(22) Filed: Sep. 15, 2022

(65) Prior Publication Data
US 2024/0092217 A1    Mar. 21, 2024

(51) Int. Cl.
*B60L 53/67*     (2019.01)
*B60L 53/30*     (2019.01)
*B60L 58/12*     (2019.01)
*G06Q 50/06*    (2012.01)

(52) U.S. Cl.
CPC ............ *B60L 53/67* (2019.02); *B60L 53/305* (2019.02); *B60L 58/12* (2019.02); *G06Q 50/06* (2013.01)

(58) Field of Classification Search
CPC ......... B60L 53/67; B60L 53/305; B60L 58/12
USPC ........................................ 320/109
See application file for complete search history.

(56) References Cited

U.S. PATENT DOCUMENTS

| | | |
|---|---|---|
| 11,225,163 B2 | 1/2022 | Yaldo et al. |
| 2013/0090936 A1 | 4/2013 | Solomon et al. |
| 2019/0213696 A1 | 7/2019 | Adepoju |
| 2022/0153156 A1 | 5/2022 | Goei et al. |

FOREIGN PATENT DOCUMENTS

| | | | |
|---|---|---|---|
| CN | 111612975 A | 9/2020 | |
| GB | 2587423 B | 3/2022 | |
| JP | 2021097558 | * 6/2021 | |
| JP | 2021097558 A | 6/2021 | |
| KR | 20190083207 A | 7/2019 | |
| KR | 20200063627 A | 6/2020 | |
| WO | WO-2020208655 A1 | * 10/2020 | ............ B60L 58/12 |

* cited by examiner

*Primary Examiner* — Richard V Muralidar
(74) *Attorney, Agent, or Firm* — Aaron Fong; American Honda Motor Co., Inc.

(57) ABSTRACT

The present disclosure relates to electric vehicle supply equipment. More particularly, this disclosure describes a private charging station availability system that allows home owners or apartment dwellers to loan or rent out their idle station. Through this system, an owner of the private charging station may define special criteria for use of their charger. In one illustrative embodiment, after receiving a request for available charging stations in an area, the system may identify public charging stations and private charging stations. The private charging stations are limited to those that meet a defined requirement such as charging stations that are limited to only using renewable energy resources, whether an owner is onsite, or local grid power usage is below a threshold. After identifying those charging stations, they may be provided in response to the request.

16 Claims, 8 Drawing Sheets

PRIVATE CHARGING STATION AVAILABILITY SYSTEM AND METHOD THEREOF

BACKGROUND

Electric vehicle supply equipment, commonly referred to as electric vehicle charging stations, may be used to charge electric vehicles. These may be owned and/or operated by many different organizations. For example, organizations such as utilities, retail establishments, schools/universities, businesses, and governments may each own and/or operate electric vehicle charging stations. These electric vehicle charging stations may be available to the public and/or restricted for use by certain electric vehicle operators.

Private individuals, who have electric vehicle charging stations at their home or apartment, have typically been excluded from offering their station to the public. Those private charging stations have been developed for use solely by the individual. These charging stations lie idle for a majority of the day resulting in lost revenue or inefficient use of the unit.

The present disclosure provides for a private charging station availability system and method thereof that removes these challenges. Through this, a private charging system may make itself known to individuals looking to charge their vehicles. Incentives, including cash, may be offered to the owners of the private charging stations. Other benefits and advantages will become clear from the disclosure provided herein and those advantages provided are for illustration. The statements in this section merely provide the background related to the present disclosure and does not constitute prior art.

BRIEF DESCRIPTION

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

In accordance with one aspect of the present disclosure, a system is provided. The system may include a receiver receiving locations of a plurality of charging stations within private residences. The system may also include a processor unit identifying available charging stations by filtering the plurality of charging stations through their locations and whether the charging stations meet a requirement defined by the private residences. In addition, the system may include a transmitter providing the locations of the available charging stations.

In accordance with another aspect of the present disclosure, a computer program product having a non-transitory computer useable storage medium to store a computer readable program that, when executed on a computer, causes the computer to perform operations is provided. These operations may include receiving a request for available charging stations in an area, identifying public charging stations within the area, identifying private charging stations within the area that meet a defined requirement, and providing locations of the public charging stations and private charging stations in response to the request.

In accordance with yet another aspect of present disclosure, an electric vehicle supply equipment is provided. The electric vehicle supply equipment system may include an interface, at least one processor, and a memory operatively coupled to the processor, the memory storing program instructions that when executed by the processor, causes the processor to perform processes. These processes may include determining whether an owner defined requirement has been met and transmitting an availability of the electric vehicle supply equipment when the owner defined requirement has been met through the interface.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

The present disclosure relates to electric vehicle supply equipment. More particularly, this disclosure describes a private charging station availability system that allows home owners or apartment dwellers to loan or rent out their idle station. Through this system, an owner of the private charging station may define special criteria for use of their charger. In one illustrative embodiment, after receiving a request for available charging stations in an area, the system may identify public charging stations and private charging stations. The private charging stations are limited to those that meet a defined requirement such as charging stations that are limited to only using renewable energy resources, whether an owner is onsite, or local grid power usage is below a threshold. After identifying those charging stations, they may be provided in response to the request.

Numerous other modifications or configurations to the private charging station availability system will become apparent from the description provided below. For example, a user interface showing private charging stations may only show a single defined requirement, instead of all three. Options may be easily selected by the owner of the private charging station. Advantageously, this allows the owner of the private charging system to define when and how they want to make their charging station available and shown to the public for taking on additional charging opportunities. Other advantages will become apparent from the description provided below.

Figure 1:
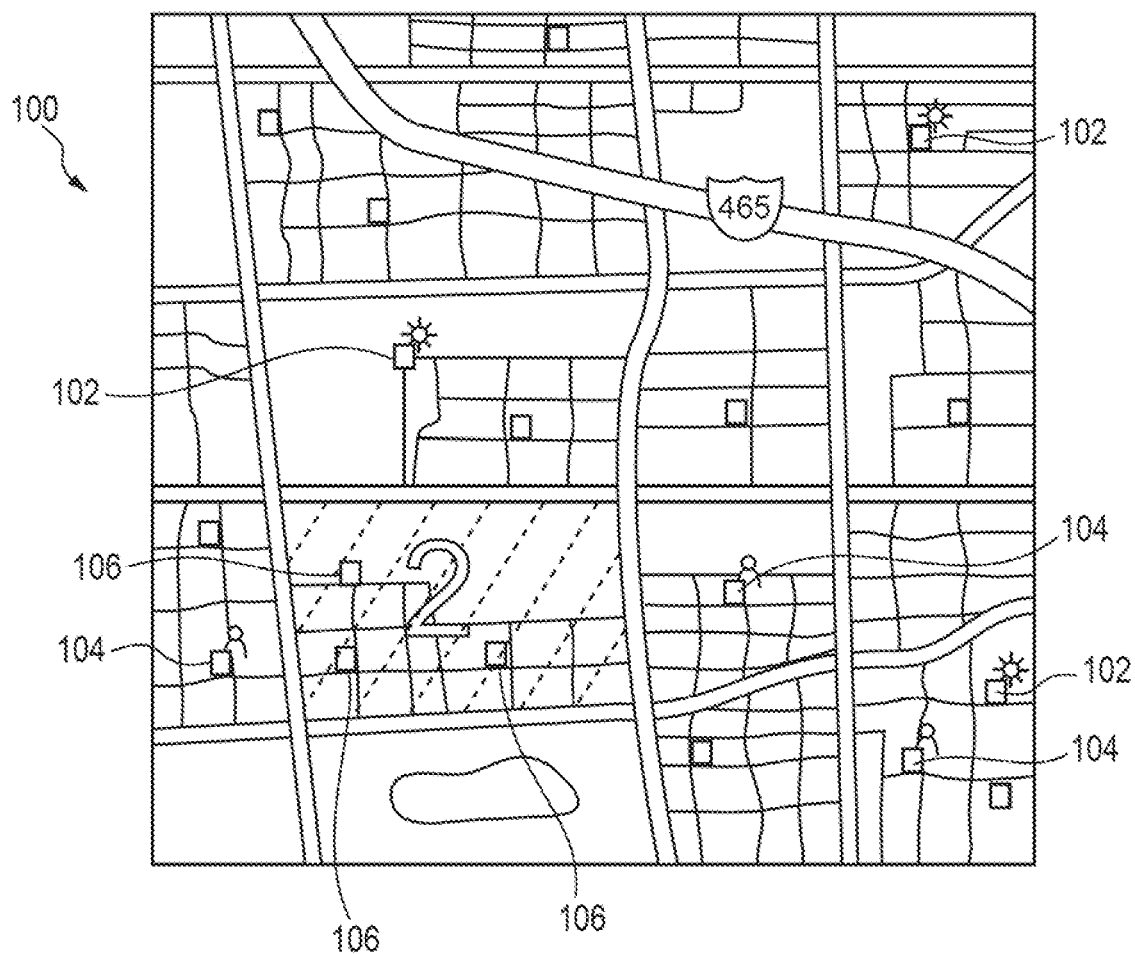
FIG. 1 is a schematic diagram showing exemplary private charging stations available for use in accordance with one aspect of the present disclosure.

Turning to FIG. 1, a schematic diagram showing exemplary private charging stations available for use in accordance with one aspect of the present disclosure is provided. A user interface 100 may be provided that maps charging stations to their location. The user interface 100 may allow a user to select what type of stations they are looking for. The user may only look for stations that are private or public. The user may also scroll around or zoom in and out of the map using known techniques to locate an appropriate electric vehicle supply equipment.

Typically, the user interface 100 for a public viewer may be proximal to a position near or around where the public viewer is at. For example, if the user is driving within their vehicle, their vehicle telematics system having a navigation system may display those charging stations that are geographically nearby. A global positioning system (GPS) may be used to determine the vehicle's location which may be then fed into a processing system to determine charging stations that are nearby.

The shown user interface 100 may be located on a number of different personal or mobile devices. For example, the user interface 100 may be on a smartphone such that a user may view the information from that device. The smartphone may also be tethered to a vehicle telematics unit where the user interface 100 may be mirrored onto a display of the vehicle. The interface 100 may run as part of the software of the vehicle telematics system itself. Vehicles may refer to an automobile, scooter, ride on device, personal mobility device, public transport, bicycle, electric bicycle, micromobility solution, and the like. In one embodiment, the user interface 100 may be shown on a desktop.

As shown in the user interface 100, there are a number of electric vehicle supply equipment in the area. Public charging stations may be available as well as private charging stations. Public charging stations may be more numerous and charge multiple vehicles at a time. Reservations may be made in these type of public charging stations. The public charging stations may be associated with a business, or public space, such as a mall, for example.

The private charging availability system may work in tandem with public charging stations to display a full set of charging stations on the user interface 100. The user interface 100 may show one, two or three factors for displaying an owner's private charging station that may be used for charging vehicles in the public. In this, way and advantageously, the private owner may be able to charge vehicles that are in the public for additional money or other incentives. This system may provide the advantage of removing the owner's private charging station from view when it is not available or certain characteristics are not met.

In one embodiment, which will be shown below, the shown charging stations 102 in the user interface 100 may be related to those that charge only when renewable energy resources are available. These charging stations 102 that use renewable energy sources may be shown as available when they may operate using renewables. Renewable energy sources may come from a variety of sources including but not limited to solar, wind, geothermal, hydropower, ocean and bioenergy. When renewables are not available, the private charging stations may not be shown, or otherwise remain offline for public viewing. One advantage of using renewable energy sources is that there would be very little power consumed from the grid. Other benefits may include energy credits which may be redeemed when a vehicle chargers their vehicle at the house using renewable energy sources. These credits may be owned by the owner of the private charging station and collected for incentives.

An additional option for displaying private charging stations may be whether the owner of the charging station is onsite, that is, owner onsite charging stations 104. These owner onsite charging stations 104 may only be shown when the owner is near or at the location. For example, the owner onsite charging stations 104 may detect that an owner is on premises by using their smartphone GPS locator. Alternatively, when sensors within the house or apartment sense a party within the house, the system may assume that this is the owner and thus the owner would be onsite. Other ways for detecting whether the owner is onsite include, but are not limited to, calendars, schedules, situational awareness devices, and the like. If the owner is not on the premises or detected, then the owner onsite charging stations 104 may be removed from the user interface 100 for public viewing.

Some charging stations which may be shown on the user interface 100 including those that are dependent on how much energy is being used in local sectors, quadrants, grids or microgrids. As each power section is unique and dependent, different amounts of electricity may vary from one sector to the next. When grid power usage is above a threshold within a certain sector, the availability system may limit whether the private charging stations would be shown within the user interface 100. Thus, these grid usage charging stations 106 may be dependent on sector energy usage. Advantageously, this may reduce the need for additional generators to be started to power the sector or remove brown/black out conditions within certain areas.

As shown in the user interface 100, the renewable energy charging stations 102, the owner onsite charging stations 104, and the grid usage charging stations 106 may all be shown at once. Combinations of the charging stations 102, 104, and 106 may be shown and are not limited to the user interface 100 described above. Furthermore, the system may link in public charging stations as differentiated from the private charging stations described herein.

Figure 2:
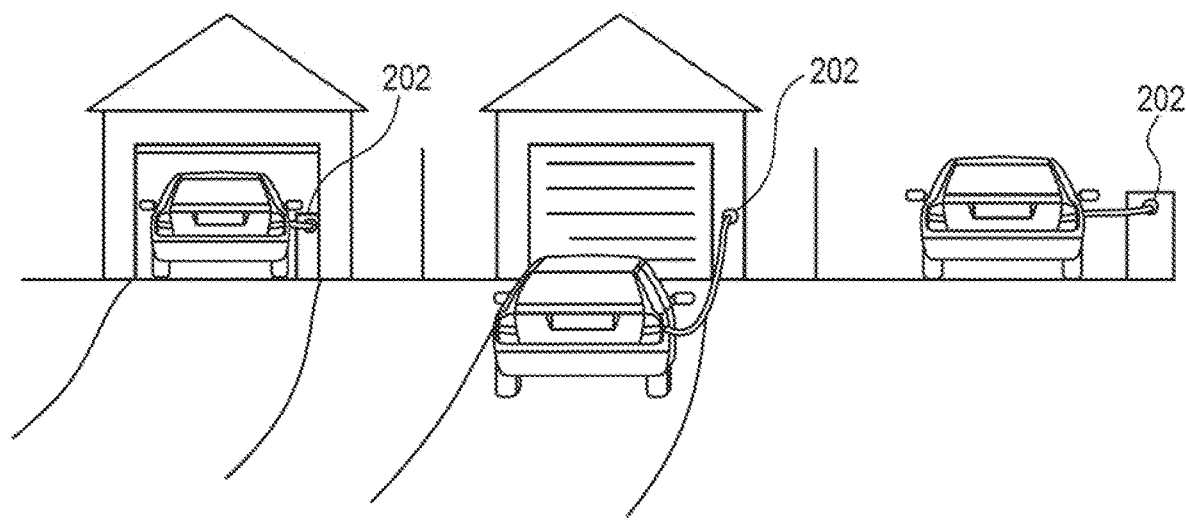
FIG. 2 is a schematic diagram detailing a variety of exemplary private charging stations in accordance with one aspect of the present disclosure.

FIG. 2 is a schematic diagram detailing a variety of exemplary private charging stations 202 in accordance with one aspect of the present disclosure. The charging stations may take the form of the renewable energy charging stations, the owner onsite charging stations, and the grid usage charging stations. The charging stations 202 may be located within the garage, for example. The charging station 202 may be accessed through a code whereby a vehicle may be driven into the house for charging. Through this, the user may plug in their vehicle while they are parked within the garage.

In one embodiment, the charging station 202 may be outside the house. This may be to prevent any property destruction or other issues. The owner may activate the charging station 202 if necessary. The charging station 202 may also be placed outside or away from the building or home.

As shown, private charging stations may come in a variety of forms and may be placed inside or outside the house or apartment. A private homeowner may be able to allow others to use their charging station for compensation or other incentive. This may reduce the number of chargers that are needed. Furthermore, less homes would be required to change their circuitry to provide power for the charging station.

While only one vehicle is shown charging at a time, the private charging station may be used to charge multiple vehicles. In one example, an additional display may be shown for the private charging station that multiple vehicles may be charged within a public user interface. In one embodiment, if there is enough renewable energy resources, an indictor may be provided on the public user interface that there are two or more private chargers available.

Figure 3:
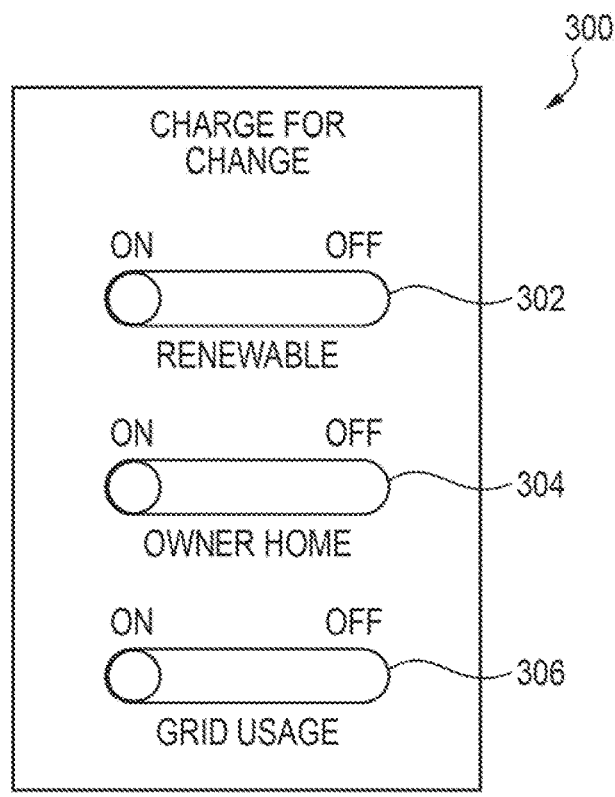
FIG. 3 is a schematic diagram providing an illustrative user interface for selecting visibility options for a private charging station in accordance with one aspect of the present disclosure.

FIG. 3 is a schematic diagram providing an illustrative user interface 300 for selecting visibility options for a private charging station in accordance with one aspect of the present disclosure. The interface 300 may include a number of other options and are not necessarily limited to those shown. These options, when selected, may include those charging stations that are renewable energy charging stations, the owner onsite charging stations, and the grid usage charging stations. Other types of buttons for toggling the specific viewable charging station may be provided and is not limited to a toggle switch as shown. This user interface is from the perspective of the private charging station owner.

The renewable option 302 may include a toggle switch for turning the private charging station on or off when there is or is not renewable energy available for charging to the public. In other words, when the renewable option 302 is on, the private charging station owner may signal to the public that their charging station is available when enough renewable energy resources may charge incoming vehicles. If it is toggled off, then the private charging station owner does not wish to make available their charging station even when renewable energy sources are available.

The private charging station owner may also toggle on and off the owner home option 304. This option 304 on the user interface 300 may allow the owner to make their charging station public when the owner or some other occupant within their dwelling is home. Advantageously, the owner or other occupant being home may be used to monitor their dwelling such that property damage does not occur. The owner home may also allow for advice on charging the vehicle and may provide real-time help. In one embodiment, another option may allow a user of the private charging station to call the owner if something goes awry.

A grid usage option 306 may also be provided where the private charging station owner may allow for charging only when certain power usages within a sector are below a threshold. For example, if the private owner toggles this option 306 to on, then the charging station may be made available to those in the public when power usage within a sector of the grid is below a threshold. This may be used to minimize the amount of energy being used and remove any brown or block out conditions that occur due to too much power being used within that sector. In one embodiment, the option 306 may allow the user to select the threshold when turned on.

Other options may exist for the owner of the private charging station that have not been disclosed herein. Furthermore, not all options, but rather a subset, may be provided to the owner depending on different capabilities of the house. For example, if the house does not have access to renewable energy resources, then the renewable option 302 may not be shown or be greyed out.

Figure 4:
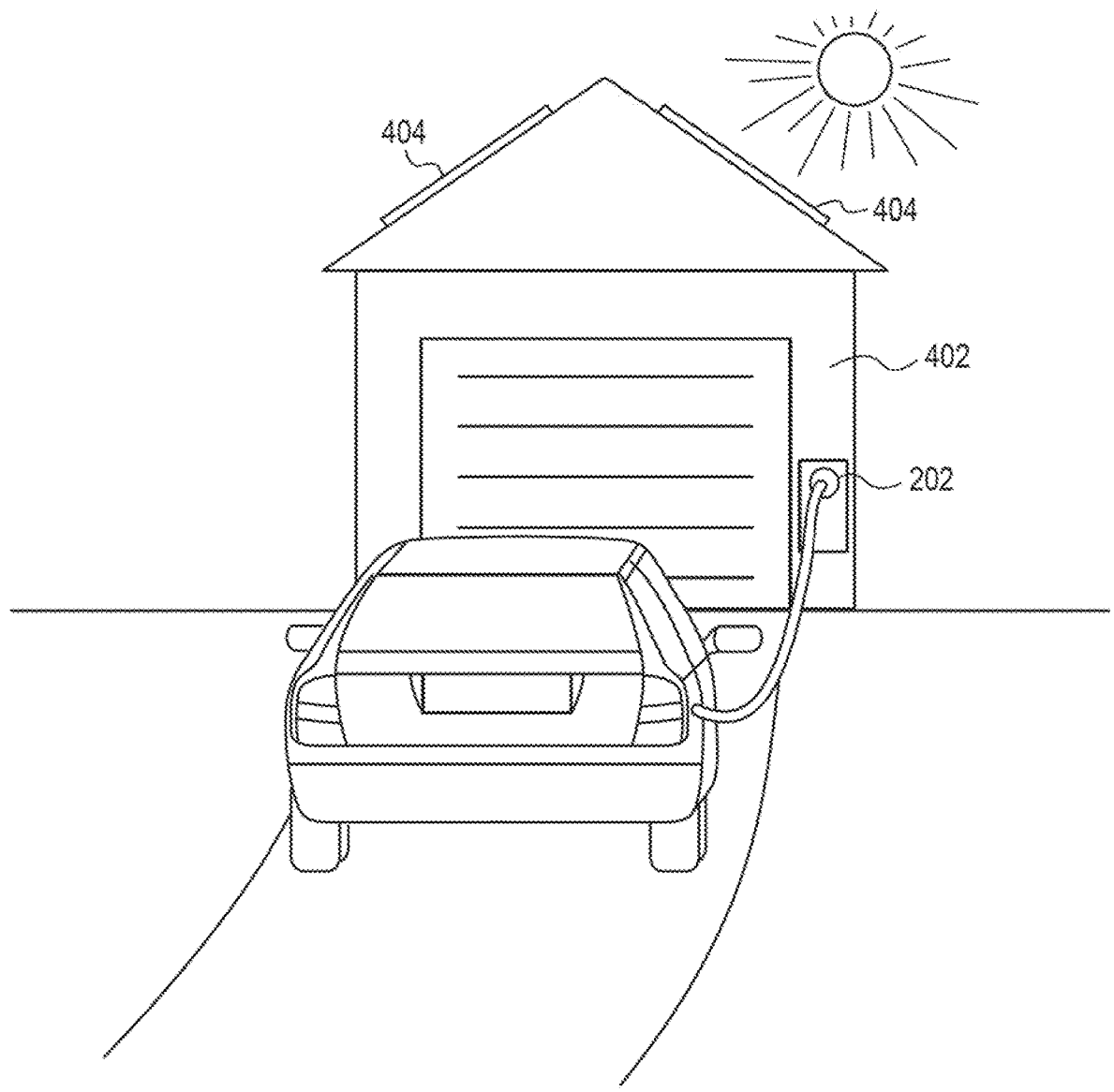
FIG. 4 is a schematic diagram providing an exemplary private charging station having access to renewable energy sources in accordance with one aspect of the present disclosure.

With reference to FIG. 4, a schematic diagram providing an exemplary private charging station 202 having access to renewable energy sources 404 in accordance with one aspect of the present disclosure is provided. The electric vehicle supply equipment 202 may be on the interior or exterior of a home 402 or apartment unit. Access may be secured. For example, power may be prevented from flowing when the charging station option 202 for renewable energy resource availability has not been selected.

The home 402 may have enabled circuitry to take in renewable energy sources 404. A local micro grid may exist that would feed in energy from the renewable energy sources 404 into the charging station 202 of the home 402. The renewable energy sources 404 may also provide power to other items or objects within the home 402 and may not be solely dedicated to providing charge for the charging station 202.

In the shown embodiment, solar panels have been provided on the home 402. Other renewable energy sources 404 may include wind, geothermal, hydropower, ocean and bioenergy, for example. The system may detect how much energy may be provided by the renewable energy sources 404. If this amount meets a threshold, then the charging station 202 may make itself available depending on whether the private charging station owner selected this option.

In one embodiment, when not enough energy may be provided by the renewable energy sources 404 atop the home, the threshold may not be met. This would exclude the private charging station 202 from being shown on the public map for view. When not enough renewable energy exists, the private charging station may not be shown on the public user interface shown earlier. For instance, if it is later in the day, enough solar energy may not be available and thus, the option of providing the private charging station would not be allowed.

Figure 5:
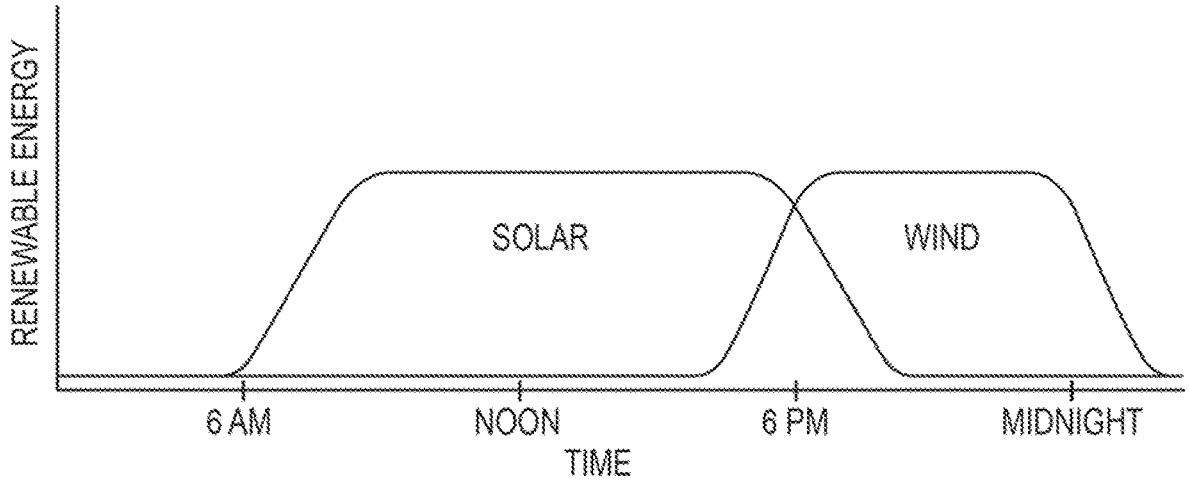
FIG. 5 is a schematic diagram providing an illustrative timing sequence for intake of the renewable energy sources in accordance with one aspect of the present disclosure.

FIG. 5 is a schematic diagram providing an illustrative timing sequence for intake of the renewable energy sources in accordance with one aspect of the present disclosure. As shown, different types of renewable energy sources may be more prevalent during certain parts of the day. For example, solar energy may be available during the times from 6:00 AM to 6:00 PM. In such instances, and if the private charging station owner allows for such charging sessions to take place, the solar energy may be used to charge the public vehicles during this time. In one embodiment and in line with the selection, the private charging station owner may determine which types of energy may be used to charge any incoming public electric vehicle. For example, the owner may specify that they would rather use solar than wind.

As time progresses, wind, a form of renewable energy resource, may be used or provide additional energy for charging vehicles. Other renewable energy resources may be available at different times of the day and may more available than solar. In this instance, wind energy may be generated from local turbines near the house or associated with the house. Alternatively, the wind may come from further locations but may be used to power the charging stations. The home would recognize such availability of this renewable energy resource and allow charging.

Figure 6:
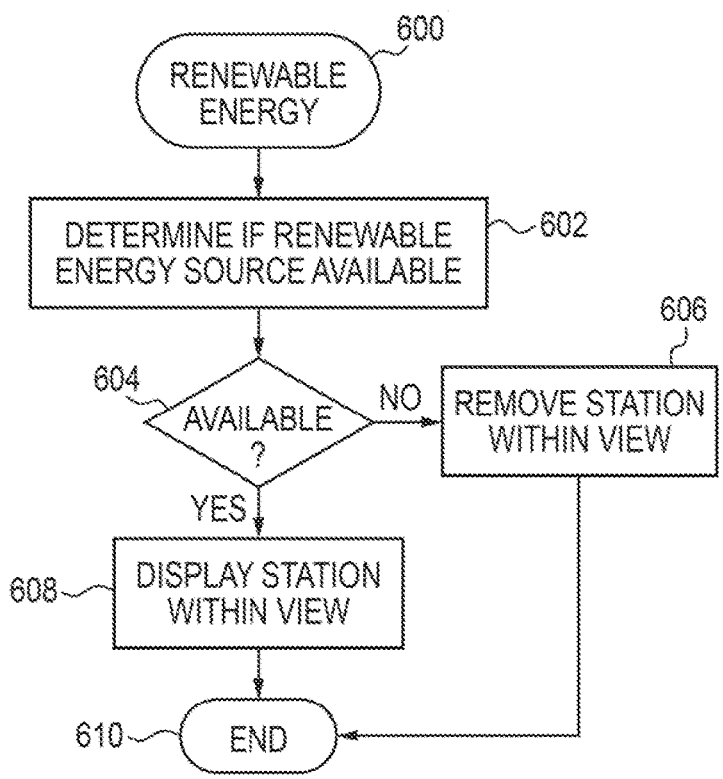
FIG. 6 is a flow chart illustrating exemplary processes for displaying the private charging station within a view in accordance with one aspect of the present disclosure.

FIG. 6 is a flow chart illustrating exemplary processes for displaying the private charging station within a view in accordance with one aspect of the present disclosure. The process may show whether to display an owner's private charging station for public view depending on whether the owner has selected the appropriate option described above. The charging station, as a result of the selection, may be shown on a public interface for those that are looking for charging their vehicles. The processes may begin at block 600.

At block 602, the availability system may determine whether renewable energy resources are available. For instance, an owner may provide that their house has solar panels or may take in wind energy sources. A utility company may be aware of the renewable energy resources available to the private charging station at their home.

The renewable energy availability determination may be made at decision block 604. If renewable energy sources are not available, then the private charging station is removed from the public view at block 606. The removal may be temporary and when the renewable energy sources are available, the private charging station may be shown for public view such that they may know that the charging station is available. If renewable energy source are available, and returning back to block 604, the private charging station may be displayed within the public view. This would allow those that wish to charge see the private charging station as an option to charge. The processes may end at block 610.

Figure 7:
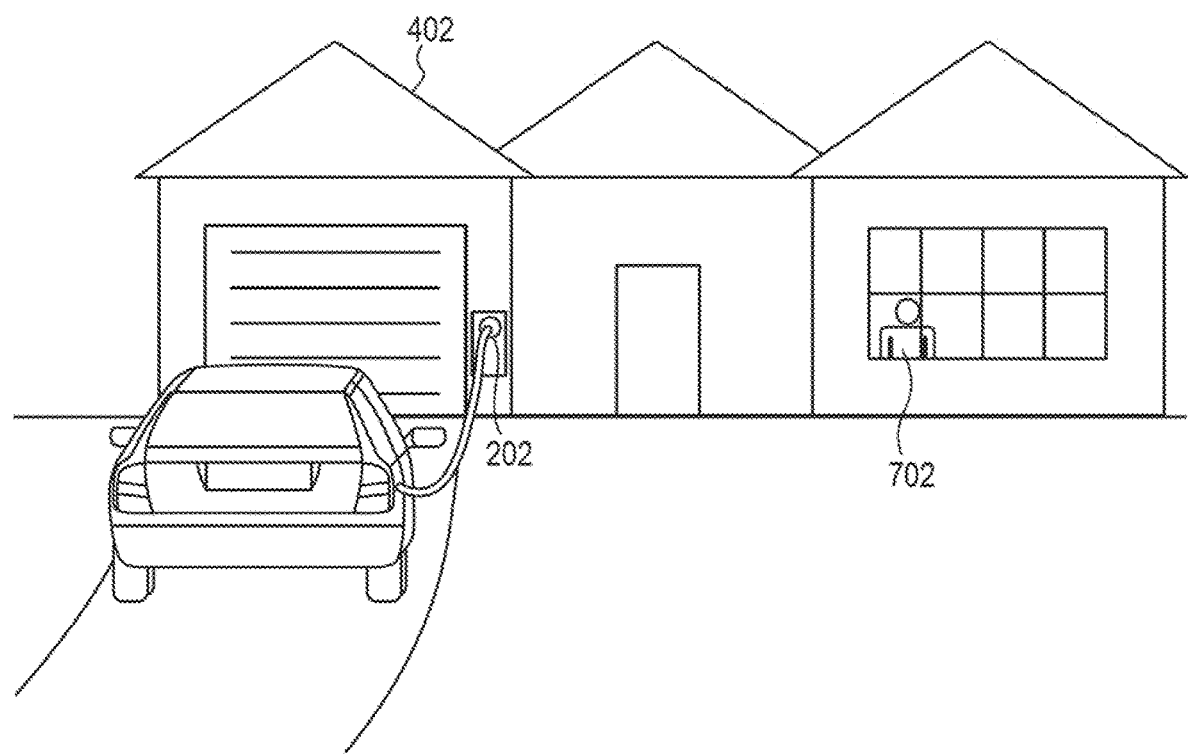
FIG. 7 is a schematic diagram providing an illustrative house having a private charging station for use when an owner is home in accordance with one aspect of the present disclosure.

As described above, in another option, the owner of the private charging station may allow for such display of their charging station for public viewing when the owner of the charging station is onsite, that is, owner onsite charging stations. FIG. 7 is a schematic diagram providing an illustrative house 402 having a private charging station 202 for use when an owner is home in accordance with one aspect of the present disclosure. These owner onsite charging stations may only be shown when the owner is near or at the location. For example, the owner onsite charging stations may detect that an owner is on premises by using their smartphone GPS locator. Alternatively, when sensors within the house or apartment sense a party within the house, the system may assume that this is the owner and thus the owner would be onsite. Other ways for detecting whether the owner is onsite include, but are not limited to, calendars, schedules, situational awareness devices, etc. If the owner is not on the premises or detected, then the owner onsite charging stations may be removed from the user interface.

In one embodiment, an owner's location within the house 402 may be sensed by their smartphone, sensors, locators, and the like. The owner 702 through these devices may be tired to a proximate location near the house 402. Other methods for detecting the owner 702, or other occupant may be used, for example, situational awareness devices, such as someone using the television, someone turning on a fan, using the air conditioning, or otherwise movement in the home 402.

Figure 8:
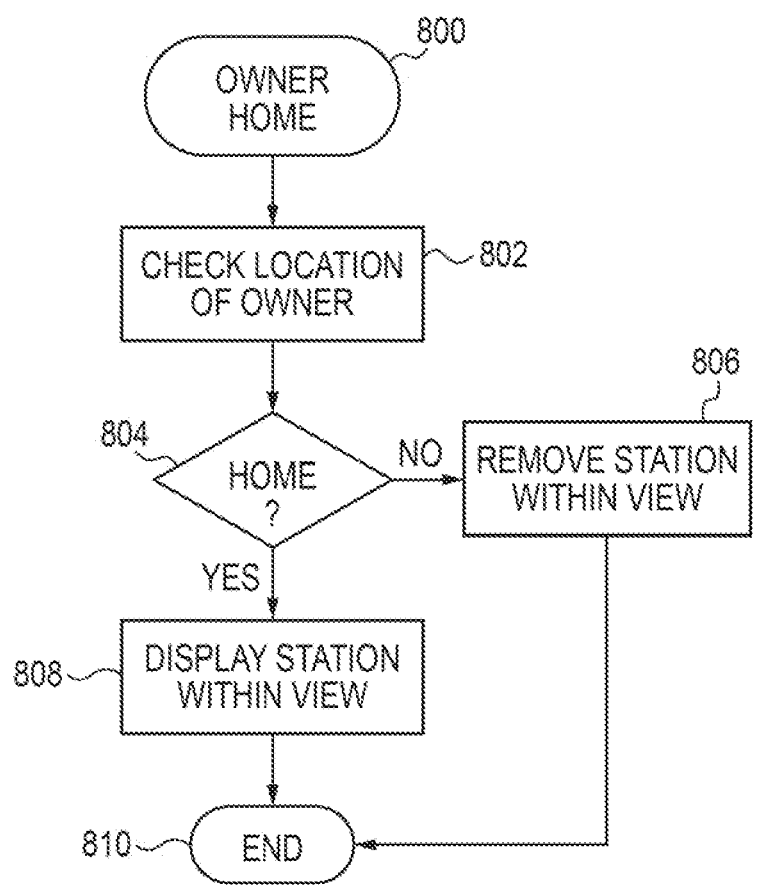
FIG. 8 is a flow chart illustrating exemplary processes for displaying the private charging station within a view in accordance with one aspect of the present disclosure.

FIG. 8 is a flow chart illustrating exemplary processes for displaying the private charging station within a view in accordance with one aspect of the present disclosure. The processes may be provided to update a public display for which a private charging station may be shown. The public display may be used on an interface for those who are looking for a charging station to charge at. The processes may begin at block 800. These processes may be used if the owner of the private charging station has selected the opt in feature described above.

At block 802, a location of the owner may be checked to determine whether they are on premises. This may be performed through those methods described above. At decision block 804, the owner's location is determined whether they are at home or not. When the user is not at home, the private charging station may be removed within view at block 806. The processes may be repeated to determine when the owner is at home. The processes may end at block 810.

Returning to decision block 804, and if the owner of the private charging station is at home, then the station may be shown within the public viewing. Through this, those wishing to charge may be able to locate the owner's private charger. The processes may end at block 810.

Figure 9:
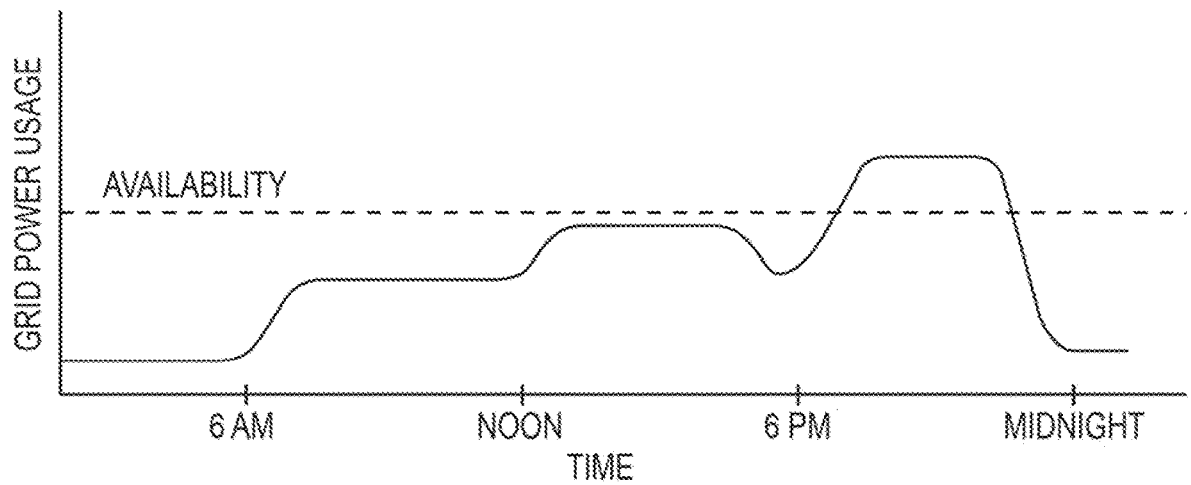
FIG. 9 is a schematic diagram providing an illustrative timing diagram for making available a private charging station when grid power usage is below a threshold in accordance with one aspect of the present disclosure.

Turning now to FIG. 9, a schematic diagram providing an illustrative timing diagram for making available a private charging station when grid power usage is below a threshold in accordance with one aspect of the present disclosure is provided. The purpose of this illustration is to show when power would be available from the private charging station. Depending on the time of day, the usage of power within a sector of the grid may vary. The private charging station may be made available to the public when the owner has selected the appropriate option and the total power usage within a sector is below a threshold.

A sector where the private charging station is used may be monitored. This sector may be dependent on a grid layout. For example, as shown earlier, the sector may correspond with a specific portion of a neighborhood. The sector may be dependent on how transformers and other wiring within the grid are laid out. Each of the sectors may have conditions where power is being used and monitored. In one example, one sector within a grid may be consuming more power than another. This may be monitored in order to make available private charging stations within the sector.

The illustrative timing diagram is for purposes of illustration and should not be construed as limiting. Typically, energy consumption begins around 6:00 AM when the sector begins to consume energy as everyone wakes up. Depending on the seasons, energy may increase within the sector around noon up until 6:00 PM. This energy usage may be constantly monitored. After 6:00 PM, energy may begin dramatically increasing. For instance, this may occur when users get home and increase their energy consumption by turning on their air conditioners or heaters. Afterwards, energy consumption may drop dramatically around midnight when most households go to sleep.

The owner of the private charging station may set a threshold availability level. This level may indicate when the sector grid power usage is above it, the owner may not want to allow the use of their private charging station. Typically, above a certain threshold may require increased rates. The line may be set by the owner of the private charging station or by other party including utilities. In one example, the threshold availability line may be lowered allowing only certain periods of the day for charging by the public.

Figure 10:
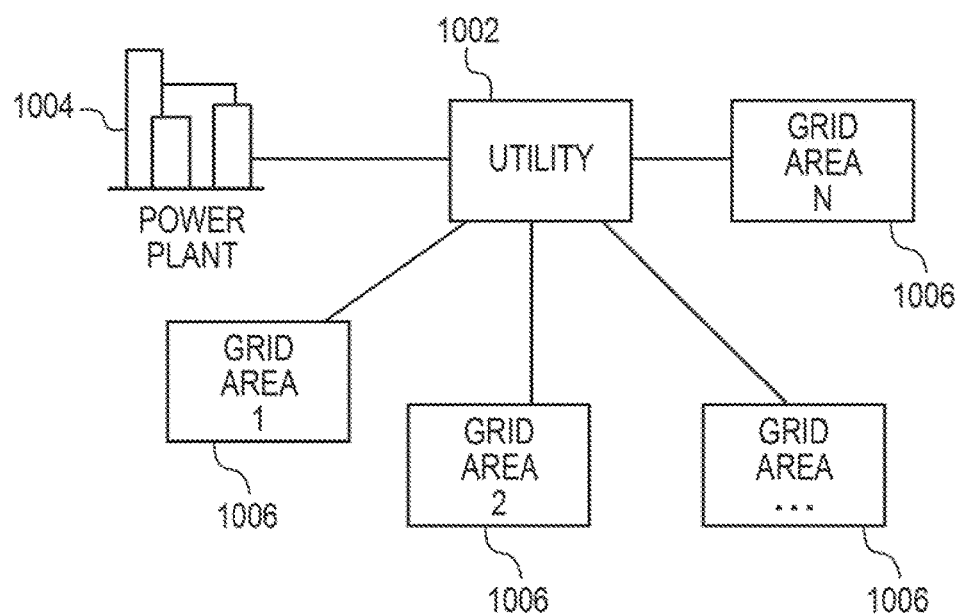
FIG. 10 is a schematic diagram providing an illustrative utility monitoring grid power usage in accordance with one aspect of the present disclosure.

FIG. 10 is a schematic diagram providing an illustrative utility 1002 monitoring grid power usage in accordance with one aspect of the present disclosure. As described above, the utility may monitor energy within a sector to determine availability of private charging stations and whether they may be allowed to charge public vehicles based on an owner input of the threshold availability level. The utility 1002, or other energy management system, may monitor the amount of energy being consumed within a sector.

A power plant 1004 may provide the energy and the utility 1002 may monitor and distribute energy between the different grid areas 1006, i.e., sectors associated with charging stations. In some instances, the energy consumed by one grid area 1006 may be more than another grid area 1006. The grid areas 1006 may vary their energy usage according to the illustrative timing diagram above. Increasing charging by allowing private charging stations to be available for public may be too much for that particular grid area 1006. In essence, by not allowing those to charge, this would reduce the amount of power consumption in the sector.

Figure 11:
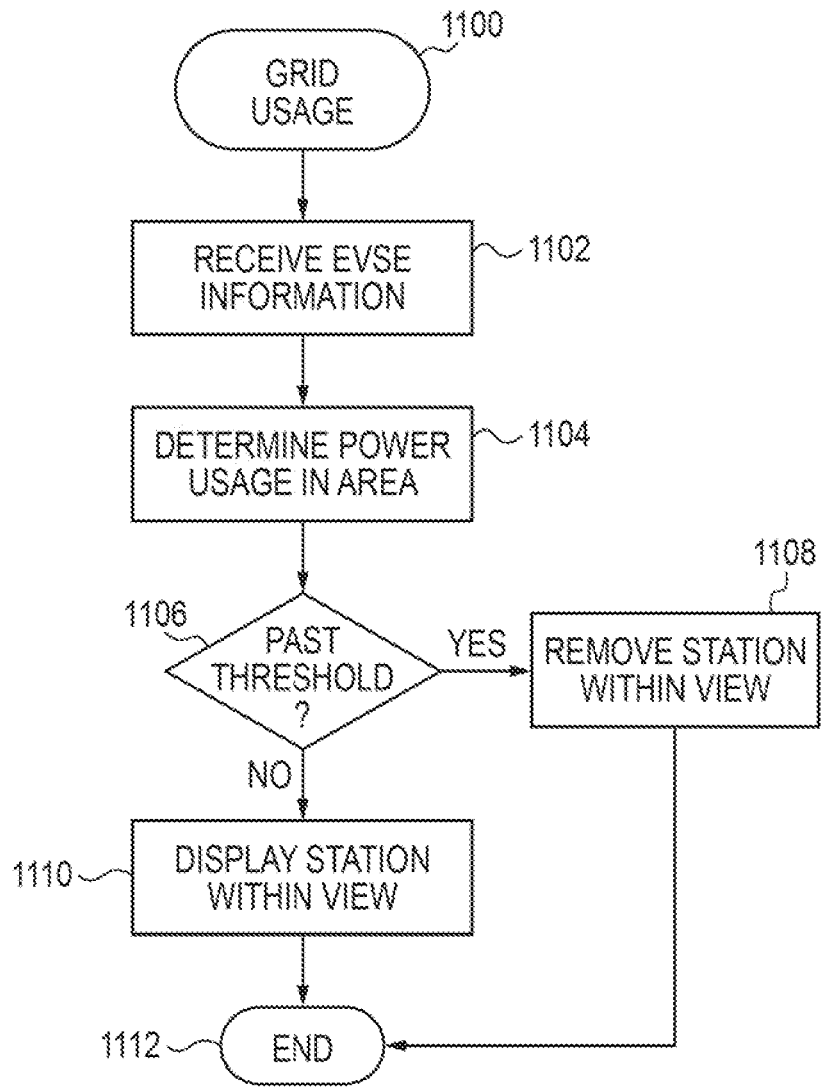
FIG. 11 is a flow chart illustrating exemplary processes for displaying the private charging station within a view in accordance with one aspect of the present disclosure.

FIG. 11 is a flow chart illustrating exemplary processes for displaying the private charging station within a view in accordance with one aspect of the present disclosure. The private charging station within a sector, or grid area, may make itself available for public consumption if the sector or grid area is below a power usage for that area. The threshold may be set by the owner, utility, or other party whereby to reduce the amount of grid power usage but still make it available for receiving additional incentives or cash by making themselves for public charging. The processes may begin at block 1100.

At block 1102, information regarding the electric vehicle supply equipment may be obtained. This may be obtained by the utility, power plant, or energy management system. This information may include which sector the private charging station is in to determine whether the private charging station should be limited based on power usage within that sector.

At block 1104, power usage in the area may be determined. This, for example, may vary depending on the time of day, month, and year. If the amount of energy is above a threshold within a sector or grid area, then making private charging stations available for public consumption may not be available due to power constraints limiting the sector.

At decision block 1106, the energy management system or other system may determine whether the usage of energy is past an availability threshold, that is, whether the energy being consumed within the specific sector or grid area is above a certain point. When the threshold is above the limit, the private charging stations may be removed from viewing on the public viewing area at block 1108. That is, a private charging station for the owner would not be shown as available. On the other hand, if the power usage is below the threshold, then the private charging station may be displayed within a public view at block 1110. The amount of energy is not above the threshold and may be shown such that the owner of the private charging station may allow their station to be used for charging. The processes may end at block 1112.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A system comprising:
   a receiver receiving locations of a plurality of charging stations within private residences;
   a processor unit identifying, in real time, available charging stations by filtering the plurality of charging stations based on:
   (i) their locations; and
   (ii) a plurality of time-varying environmental and operational parameters defined by the private residences, including whether renewable energy resources are currently available for charging, whether an owner is onsite, and whether local grid power usage is below a threshold; and
   a transmitter providing updated locations of the available charging stations for display to users only when all of the defined parameters are satisfied.

2. The system of claim 1, wherein receiving the locations of the plurality of charging stations within the private residences comprises establishing a connection with the private residences and registering the private residences for the system.

3. The system of claim 1, wherein the private residences comprise of at least one of a home and an apartment.

4. The system of claim 1, wherein dynamically filtering the plurality of charging stations comprises receiving a real-time location from a vehicle and identifying available charging stations nearby the location.

5. The system of claim 1, wherein dynamically filtering the plurality of charging stations comprises receiving a real-time state-of-charge (SOC) from a vehicle and identifying the available charging stations based on the SOC in combination with the time-varying environmental and operational parameters.

6. The system of claim 1, wherein the requirement defined by the private residences is whether renewable energy sources are currently available for charging.

7. The system of claim 1, wherein the requirement defined by the private residences is based solely on whether an owner is onsite.

8. The system of claim 1, wherein the requirement defined by the private residences is based solely on whether grid power usage is below a minimum threshold.

9. The system of claim 1, wherein providing the locations of the available charging stations comprises sending the locations to a vehicle telematics unit.

10. A computer program product comprising a non-transitory computer useable storage medium to store a computer readable program that, when executed on a computer, causes the computer to perform operations comprising:
    receiving a request for available charging stations in an area;
    identifying public charging stations within the area;

identifying private charging stations within the area that meet a plurality of concurrently satisfied time-dependent requirements defined by respective private residences, including renewable energy availability, owner presence, and grid power thresholds; and providing only the subset of private charging stations meeting all of the requirements in response to the request.

11. The computer program product of claim 10, wherein receiving the request from the available charging stations in the area is from a vehicle telematics unit.

12. The computer program product of claim 10, wherein the defined requirement is whether a private charging station uses currently available renewable energy sources for charging.

13. The computer program product of claim 10, wherein the defined requirement is based solely on whether a private charging station has an owner onsite.

14. The computer program product of claim 10, wherein the defined requirement is based solely on whether local grid power usage is below a minimum threshold.

15. The computer program product of claim 10, wherein the computer readable program, when executed on the computer, causes the computer to perform operations to provide prices for the public charging stations and private charging stations in response to the request.

16. The computer program product of claim 10, wherein providing the locations of the public charging stations and private charging stations comprises sending the locations of the public charging stations and private charging stations on a map of the area.

* * * * *